United States Patent [19]

Kenny et al.

[11] Patent Number: 4,949,779
[45] Date of Patent: Aug. 21, 1990

[54] REGULATING HEATER DISCHARGE AIR TEMPERATURE FOR FRONT AND REAR PASSENGERS IN A VEHICLE

[75] Inventors: Andrew A. Kenny, Roselle; Thomas F. Glennon, Darien; Rudolph J. Franz, Schaumburg; Dennis DeVera, Carol Stream, all of Ill.

[73] Assignee: Eaton Corporation, Cleveland, Ohio

[21] Appl. No.: 473,141

[22] Filed: Feb. 1, 1990

[51] Int. Cl.[5] .......................... F25B 29/00; B60H 1/02
[52] U.S. Cl. .......................................... 165/2; 165/42; 165/43; 165/140; 165/22; 237/2 A; 237/12.3 B; 236/91 F; 318/641
[58] Field of Search .................... 165/22, 42, 43, 140, 165/2; 287/2 A, 12.3 A, 12.3 B; 236/91 F; 318/641

[56] References Cited

U.S. PATENT DOCUMENTS

| | | | |
|---|---|---|---|
| 3,072,339 | 1/1963 | Lamburn et al. | 237/12.3 A |
| 3,183,962 | 5/1965 | Steinhagen et al. | 165/42 |
| 4,070,610 | 1/1978 | Rudich, Jr. | 318/641 |
| 4,375,754 | 3/1983 | Okura et al. | 62/180 |
| 4,417,688 | 11/1983 | Schnaibel et al. | 236/91 F |
| 4,462,541 | 7/1984 | Hansen | 237/2 A |
| 4,470,270 | 9/1984 | Takada et al. | 62/244 |
| 4,540,040 | 9/1985 | Fukumoto et al. | 165/43 |
| 4,570,450 | 2/1986 | Takemi et al. | 62/243 |
| 4,815,658 | 3/1989 | Hidemitsu et al. | 237/2 A |

FOREIGN PATENT DOCUMENTS

| | | | |
|---|---|---|---|
| 0022264 | 1/1981 | European Pat. Off. | 237/12.3 B |
| 2831022 | 1/1980 | Fed. Rep. of Germany | 165/140 |
| 0018514 | 1/1982 | Japan | 165/43 |
| 0064518 | 4/1986 | Japan | 237/5 |

OTHER PUBLICATIONS

Ford Marketing Corp., 1972 Car Shop Manual, vol. 3 Electrical 10/1971 pp. 36-31-10.

Primary Examiner—John Ford
Attorney, Agent, or Firm—R. A. Johnston

[57] ABSTRACT

A temperature control system for a passenger van having individual temperature selection controls for passengers in the forward and rear sections of the passenger compartment. Separate exothermic heat exchangers for circulation of engine coolant therethrough are provided for the forward and rear passengers. Each heat exchanger is supplied by a coolant control valve and individual blowers provide a stream of forced air over the heat exchangers. A thermistor senses the temperature of the air discharge over each heat exchanger and a controller sums the sensed temperature signal with a user selected relative temperature reference signal provided independently by the forward and/or rear passenger selector inputs and a valve position signal; and, the controller generates a control signal proportional to the summation. An electrical actuator for each valve moves the valve until the sum is a null for controlling coolant flow to each heat exchanger to thereby regulate the discharge air temperature about the individually selected relative levels for the front and rear independently of the selected blower speed. Air conditioning evaporators may be disposed upstream of each of the heat exchangers; and, the thermistors sense the combined effect of heating and cooling and the system continues to modulate coolant flow to the heat exchangers for temperature regulation.

18 Claims, 2 Drawing Sheets

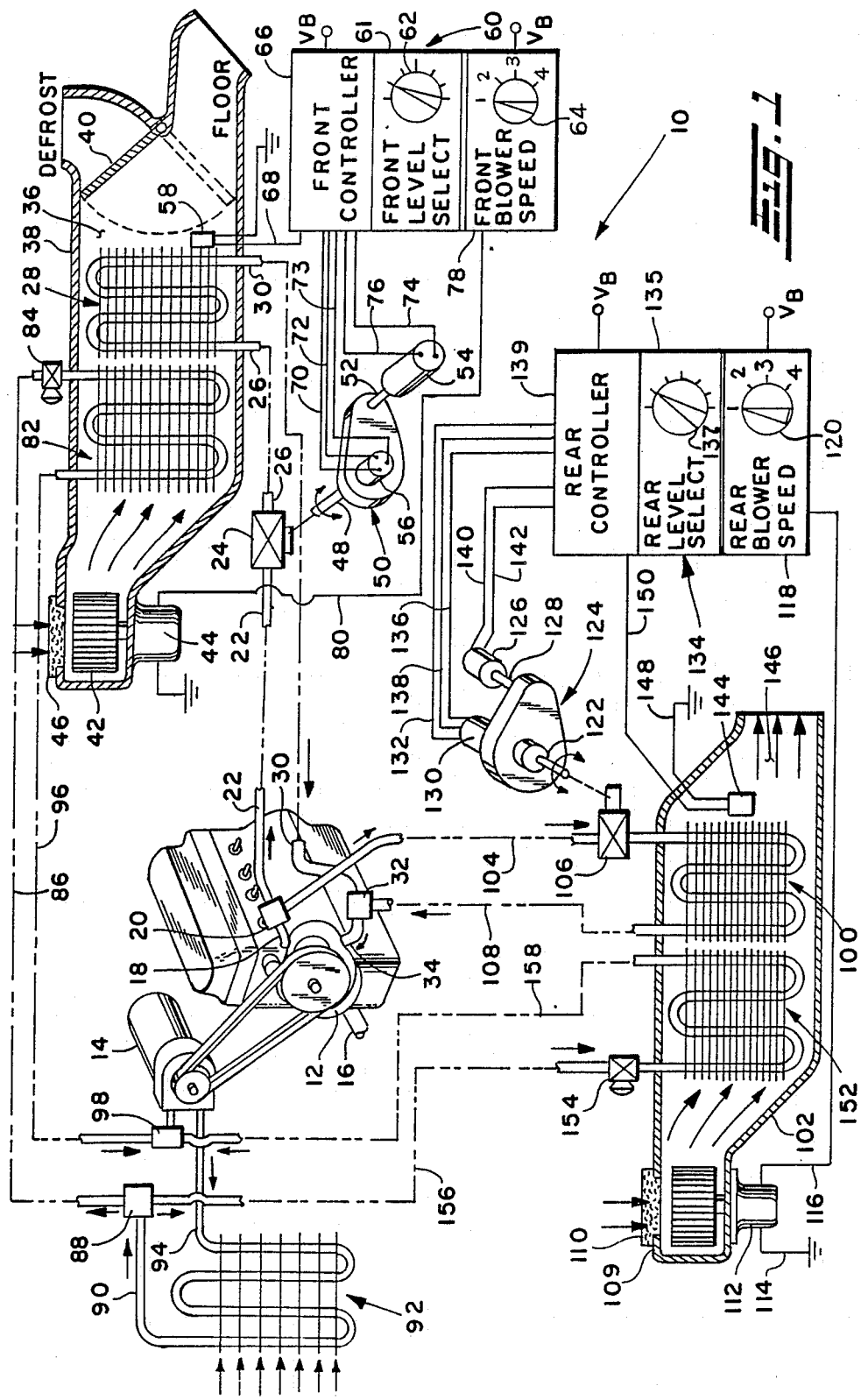

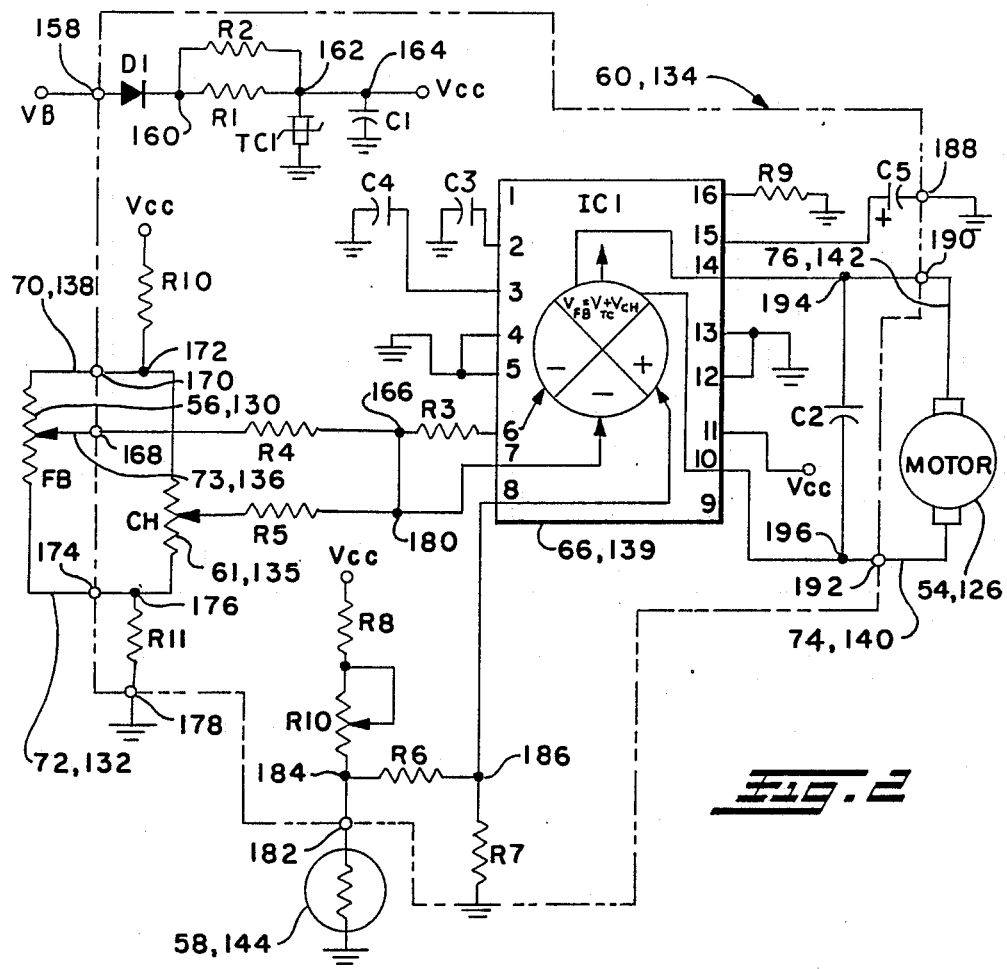
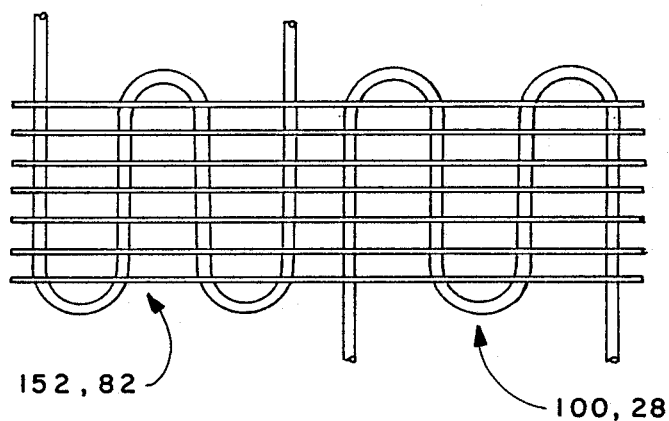

REGULATING HEATER DISCHARGE AIR TEMPERATURE FOR FRONT AND REAR PASSENGERS IN A VEHICLE

BACKGROUND OF THE INVENTION

The present invention relates to passenger comfort or climate control systems employed in the passenger compartment of automotive vehicles and particularly those having large passenger compartments and typically vehicles having body styles of the van or station wagon type.

Heretofore, the heating and air conditioning systems for vans and station wagons have in the majority of commercially produced vehicles, provided for forced air discharge emanating from the dashboard region of the vehicle passenger compartment. Dashboard location of the air discharge outlet in vans and station wagons has resulted in uneven temperature distribution within the passenger compartment causing the system to be set for extreme of temperature control in order to provide adequate heating or cooling for the passengers in the rear section of the passenger compartment. This has often resulted in uncomfortably extreme heating or cooling of the passengers in the forward section of the passenger compartment.

In order to provide increased heating or cooling capacity of the climate control system for the rear passengers, some vehicles have been equipped with auxiliary heat exchangers, in addition to the forward or dash mounted units, with the auxiliary heat exchangers mounted separately in the wall of the vehicle in the rear section of the passenger compartment. Typical installations of this sort have employed a separate heat exchanger in the rear section for circulating engine coolant as a heating medium and an evaporator heat exchanger for circulation of refrigerant for providing cooling to the rear section of passenger compartment. A separate blower has been provided adjacent the rear mounted heat exchangers with a simple blower speed control accessible by the rear passengers. However, passengers seated directly adjacent the blower discharge for the rear heating and cooling heat exchangers have been subject to discomfort when the blower speed was increased to provide greater heating or cooling output responsive to ambient conditions necessitating greater cooling or heating for the comfort of the rear passengers. Manually controlling blower speed to manage rear van temperature requires constant attention from the operator as discharge on temperature varies with vehicle speed, acceleration, ambient temperature and sun load, affecting passenger comfort and satisfaction.

Accordingly, it has long been desired to find a way or means of providing uniform temperature distribution in a vehicle passenger compartment for the comfort of both front and rear passengers; and, it has also been desired to do so in a manner which allowed for individual selection of the temperature in the forward and rear passenger compartment sections. It has further been desired to find a way to provide for automatic temperature regulation despite blower speed changes selected by the passengers.

SUMMARY OF THE INVENTION

The present invention provides a control system for regulating the temperature of forced air discharged from a vehicle passenger compartment climate control system. The present invention provides for front passenger control of the relative air temperature of forced air directed over heat exchangers disposed for heating and cooling the front section of the passenger compartment. The invention provides for separate rear passenger selection of the desired relative level of temperature and provides for automatic regulation of the discharge air temperature over separate heat exchangers disposed in the rear section of the passenger compartment. A butterfly type water valve is provided at the inlets of each of the individual front and rear exothermic heat exchangers or heater cores; the position of the valve is modulated in response to a control signal for controlling flow of the engine coolant or heating fluid to the exothermic heat exchanger.

A thermistor is disposed adjacent both the front and rear heat exchangers to sense the temperature of the forced air discharged over the heat exchangers and into the passenger compartment. Individual temperature selection controllers are provided in the forward and in the rear section of the passenger compartment for selection of the desired relative temperature level respectively by the passengers in that section. An electronic controller sums an electrical reference signal, representing the relative temperature selected in the particular section, with the temperature sensed by the thermistor in that section of the compartment and an electrical valve position feedback signal. The controller generates a control signal proportional to the sum and a motorized valve servo-actuator is responsive to the control signal to move the valve until the sum is nulled to thereby control the flow of engine coolant to the heater core and regulate the discharge air temperature to the passenger compartment about the selected relative level.

In the simplest form of the invention, only a heating mode or exothermic heat exchanger is employed in the front and rear; and, the respective thermistors sense the temperature of the heated air directed over the heating mode heat exchangers in the front and rear of the passenger compartment. In the preferred practice of the invention, a refrigerant evaporator or endothermic cooling heat exchanger is disposed in the forced air stream upstream of the heater core or exothermic heat exchanger or between the heater core and the blower. In this preferred arrangement, a module assembly is provided with the evaporators and heater cores in tandem in the forced air stream in the plenum housing; and the sensed temperature is the result of the combined effects of cooling and heating of the forced air. The present invention thus provides separate climate control units for front and rear passengers and enables passengers in the rear section of the van passenger compartment to select a desired temperature level for automatic regulation of the air discharging to the rear section of the passenger compartment independently from such a selection by the front passengers.

The control system of the present invention provides a novel technique for passenger compartment temperature regulation and functions to automatically modulate the position of a valve controlling flow of coolant to a heater core disposed in that section of the compartment for regulating discharge air about the user selected relative level. The control system of the present invention provides for automatic continuous regulation of the blower discharge temperature about a level selected by the passengers in a section of the compartment irrespective of the blower speed selected. The present invention thus provides for automatic modulation of hot water valves separately supplying front and rear passenger heaters and thereby provides separate automatic regulation of the relative temperature of the blower air discharged over each heater. The automatic regulation accommodates passenger selected blower speed changes and the addition of air conditioning heat exchangers upstream in the blower air stream.

BRIEF DESCRIPTION OF THE DRAWINGS

FIG. 1 is a pictorial, somewhat schematic representation of the control system showing the arrangement of the heat exchangers, controllers and valve actuators; and, FIG. 2 is an electrical schematic of the circuitry employed in the system of FIG. 1; and FIG. 3 is an illustration of the exothermic and endothermic heat exchangers sharing common fins.

DETAILED DESCRIPTION

Referring to FIG. 1, the control system of the present invention is indicated generally by the reference numeral 10 and is shown as installed in a typical passenger automotive van having an engine driven water pump 12 for circulating engine coolant and also an engine driven refrigerant compressor 14 for circulating refrigerant. The water pump 12 has a primary inlet 16 for receiving therein coolant from the radiator (not shown); and, the pump has its primary outlet communicating with the coolant passages for circulation of coolant through the engine and which are not shown in FIG. 1. Water pump 12 has an auxiliary outlet 18 which is connected to a junction block 20 for providing a source of engine coolant through conduit 22 to the inlet of a control valve 24, preferably of the butterfly type, which has its outlet connected through conduit 26 to the inlet of a front heater core or heat exchanger indicated generally at 28. The heater core 28 circulates coolant through conduit 30 to a junction block 32 which is connected to an auxiliary return 34 of the water pump 12. In the presently preferred practice, valve 24 is a by-pass type butterfly valve giving substantially full flow with 30° rotation of the butterfly from the closed position.

Heater core 28 is disposed in a plenum chamber 36 formed within a housing or duct 38 disposed in the dashboard region or forward section of the van passenger compartment. The housing 38 has an upper or "DEFROST" outlet and a lower or "FLOOR" outlet with a pivotally disposed vane or mode select door 40 which provides for selection of the outlet to be supplied. Vane 40 may be moved by any suitable type of actuator (not shown) either manually controlled or automatic.

Housing 38 also has disposed therein a suitable blower 42 driven by motor 44 mounted externally to the housing and with the shaft thereof extending through the housing wall. Blower 42 is supplied with air through a suitable filtered inlet 46 which may be selectably connected (by means not shown) for either recirculation of passenger compartment air or for intake of ambient air from the vehicle exterior as is well known in the art. Upon energization of motor 44, blower 42 provides a flow of air over the heat exchanger 28 for discharge through either the FLOOR or DEFROST outlets as desired.

The butterfly control valve 24 is connected via shaft 48 to a rotary servo-actuator, indicated generally by numeral 50, which has a shaft 48 as its output and an input shaft 52 thereof connected to a suitable reversible 12 volt DC motor 54. Actuator 50 has provided thereon a position sensor for output shaft 48 in the form of potentiometer 56 which is operative as will be hereinafter described, to provide an electrical signal indicative of the rotary position of shaft 48. Actuator 50 is operative upon the energization of motor 54 to rotate output shaft 48 in either a clockwise or counter clockwise sense for moving a butterfly vane member (not shown) within valve 24 for modulating coolant flow to the heat exchanger 28. In the presently preferred practice, servoactuator 50 includes a speed reducer providing a reduced rate of rotation at output shaft 48. A ratio of 30:1 has been found satisfactory from input to output of the servo-actuator 50, but other ratios may be employed as desired to provide differing rates of response.

Although a D.C. motorized servo-actuator with a feedback potentiometer is disclosed, it will be understood that the potentiometer can be eliminated if desired. Also, a stepper motor may be employed, in which case the speed reducer will not require the high ratio of input to output; and, if stepper motor torque is sufficient, speed reduction may not be required.

A discharge air temperature sensor in the form of thermistor 58 is disposed within the plenum 36 closely adjacent the downstream or discharge edge of the heater core 28 for sensing the temperature of the air in the plenum chamber.

A front control module indicated generally by reference numeral 60 is disposed within the front section of the van passenger compartment in a suitable manner as to be readily accessible to the front passengers and preferably dashboard mounted. The module 60 includes a front temperature LEVEL SELECT control 61 having a rotatable knob 62, an electronic controller 66 and may include a front blower speed control 78 having a selector knob 64. The controller 66 receives power from the vehicle power supply $V_B$ and is connected to receive an input from thermistor 58 along lead 68 and is also connected to the receive an input from the feedback potentiometer 56 along leads 70, 72. Drive motor 54 is connected to controller 66 via leads 74, 76; and, the blower motor 44 is connected on one side to blower speed control 78 by lead 80 with the opposite lead of the motor grounded to the common ground for the supply $V_B$.

If the vehicle is equipped with passenger compartment air conditioning, a second endothermic heat exchanger comprising a refrigerant evaporator, indicated generally by numeral 82, is disposed in the housing 38 upstream of the heater core 28 or between the heater core 28 and the blower 42. Evaporator 82 is supplied by a thermal expansion valve 84 which has its inlet connected via conduit 86 to the outlet of a junction block 88 which is supplied at its inlet via conduit 90 from the refrigerant liquefication heat exchanger or condenser indicated generally by numeral 92. Condenser 82 is supplied via conduit 94 which is connected to the high pressure discharge outlet part of compressor 14. If desired, the fluid circulation tubes of evaporator 82 and heater core 28 may be mounted in tandem in the blower stream in a common integral set of fins for heat exchange with the blower air.

In the system illustrated in FIG. 1, the flow of refrigerant to the evaporator 82 is controlled by the thermal expansion valve in a manner well known in the art to maintain optimum vaporization of the liquid coolant such that a slight amount of superheat is provided at the outlet of the evaporator and that no liquid is returned through conduit 96 via junction block 98 to the low pressure suction port of compressor 14. With the evaporator 82 in place in the blower stream ahead of the heater core 28, the thermistor 48 is operative to sense the combined cooling and heating effect of the two heat exchangers. The temperature of the forced air flow in plenum chamber 36 is controlled in this arrangement by modulating the position of the water valve 24 and controlling the flow of coolant through the evaporator 28. Thus, it will be seen that the simplest form of the system, which employs only heater core 28 retains the ability to control and regulate the plenum discharge temperature upon the addition of air conditioning evaporator 82 into the system. Thus, the control system may be employed either with or without air conditioning in the vehicle.

With continued reference to FIG. 1, a second heat exchanger or heater core indicated generally by reference numeral 100 is disposed in a second housing or duct 102 which is located in the rear section of the van passenger compartment. The heater core 100 receives heated engine coolant via conduit 104 through control valve 106 and returns flow to the water pump via conduit 108 and junction block 32. Blower 108 is disposed in the remote end of the housing 102 and is supplied air through filter 110 and is driven by a shaft extending through the housing 102 and connected to an externally mounted motor 112. The motor is preferably a 12 volt direct current motor with one side grounded via lead 114 and the other side connected via lead 116 to a blower speed control 118 having a selector knob 120 positionable by the rear passengers for selection of the desired blower speed.

The control valve 106 is preferably of the butterfly type similar to valve 24; and, the valve 106 is positioned by rotation of shaft 122 connected to the output of a servo-actuator indicated generally by the reference numeral 124, and driven by motor 126 connected to the input thereof via shaft 128. The servo-actuator 124 has an output shaft position sensor 130 in the form of a feedback potentiometer similar to potentiometer 56 and connected to a rear control module 134 via leads 132, 136 and 138. Control module 134 includes electronic controller 139, rear temperature level selector 135 and may include blower speed control 118. Motor 126 is connected to the rear electronic controller 139 via leads 140, 142.

A temperature sensor in the form of thermistor 144 is disposed within the housing 102 downstream of the heater core 100 for sensing the temperature of the forced air flow discharging from plenum chamber 146 which is formed in the housing 102 adjacent the outlet thereof. The thermistor 144 and thermistor 58 preferably comprise negative temperature coefficient (NTC) devices having a resistance of 37 kilo-Ohms at 25° C.; and, a suitable device is available from Keystone Carbon Corp., St. Marys, Penna. bearing manufacturer's type number A919. Thermistor 144 has one side thereof grounded along lead 148 with the other side connected to the rear controller 139 via lead 150.

In the preferred practice, an endothermic heat exchanger or refrigerant evaporator, indicated generally by reference numeral 152, is provided for air conditioning and is also disposed within housing 102 and immediately adjacent and upstream of the heater core 100. Evaporator 152 is supplied at its inlet by a thermal expansion valve 154 similar to valve 84 and supplied by conduit 156 connected to receive a flow of refrigerant from junction block 88. Evaporator 152 returns vaporized and superheated refrigerant via conduit 158 to junction block 98 for return to the compressor suction port. It will be seen that the thermistor 144 senses the combined cooling and heating effects of evaporator core 152 and heater core 100 to modulate valve 106 and control coolant flow through the heater core 100 to maintain the temperature in plenum 146 regulated about the selected relative level. In the simplest form, the invention provides automatic blower air discharge temperature regulation for front and rear heater cores 28,100. However, in vehicles equipped with air conditioning, the addition of front and rear evaporators 82,150 is accommodated and the system will continue to provide individual regulation of front and rear blower air discharge temperature about a selected relative level.

Referring to FIG. 2, the electrical circuitry for the invention is illustrated and includes a power supply for the control modules 60, 134 wherein the onboard vehicle power supply $V_B$ is connected through terminal 158 and through Diode D1 to junction 160. A pair of resistors R1 and R2 are connected in parallel to junction 160 and junction 162 which is grounded through Zener device TC1 which is a 22 volt metal oxide varistor functioning as a transient suppressor. Junction 162 is connected by a lead to junction 164 which is grounded through capacitor C1 and which provides the power supply voltage Vcc.

The controllers 139, 66 each comprise a microprocessor designated IC1 in FIG. 2 and, which, in the presently preferred practice of the invention bears manufacturer's designation MC33030 and is available from Motorola Semiconductor Div. Schaumberg, Ill. The microprocessor IC1 receives at pin 6 thereof a signal through resistor R3 which is connected via junction 166 and through resistor R4 to terminal 168. The feedback potentiometers 56, 130, denoted by the reference character FB in FIG. 2, have the movable wiper of potentiometer FB connected by respectively leads 73, 136 to terminal 168.

The potentiometer FB has one lead 70,138 of the resistor thereof supplied through resistor R10 and junction 172 with the regulated voltage Vcc. The remaining lead 72,132 of the potentiometer resistance 56,130 is connected through the terminal 174, to junction 176 which is grounded through resistor R11 and terminal 178.

The LEVEL SELECT controls respectively 61, 135, each comprise a potentiometer denoted by the reference character CH in FIG. 2 with one lead of the resistance 61,135 connected to junction 172 for biasing by the supply voltage Vcc; and, the remaining lead of the resistor is connected to junction 176. The movable wiper of the potentiometer CH is connected via resistor R5 to junction 180 which is connected to input pin 7 of IC1 and also to junction 166. Pins 4 and 5 of IC1 are grounded and pin 2 is connected to ground through capacitor C3; whereas, pin 3 is grounded through capacitor C4.

The temperature sensors 58, 144 each comprise an NTC thermistor having one side grounded and the other side connected through terminal 182 to receive power supply voltage Vcc through resistor R8 and trim resistor R10 via junction 184. The voltage at junction 184 is applied through resistor R6 and junction 186 to input pin 8 of IC1. Junction 186 is also connected through resistor R7 to ground.

Output pin 16 of IC1 is grounded through a resistor R9; and, pin 15 is also grounded through capacitor C5 via terminal 188. Pins 12 and 13 are grounded and pin 11 is connected to receive the supply voltage Vcc. Output pin 14 is connected to terminal 190 and respectively leads 76, 142 which are connected to one side respectively of the servo-actuator motors 54,126; and, the opposite side of the motors are connected respectively to leads 74, 140 and to terminal 192 which is connected to output pin 10 of IC1. Capacitor C2 is connected across the motor leads at junctions 194, 196. The values of resistances and capacitances are set forth in Table I below:

TABLE I

| Resistance | | Capacitances | | Other | |
|---|---|---|---|---|---|
| R | Ohms | C | Microfarads | | Devices |
| 1,2 | 27-1/2W | 1 | 0.33 | TC1 | 22V |
| 3 | 56K | 2 | 0.1 | IC1 | MC33030 |
| 4,5 | 33K | 3 | 0.1 | 58,144 | 37K-NTC |
| 6 | 27K | 4 | 0.1 | | |
| 7 | 91K | 5 | 1 | | |
| 8 | 4K | | | | |
| 9 | 68K | | | | |
| 10,11 | 2.5K | | | | |
| FB,CH | 5K | | | | |

In operation, each controller 139,66 acts as a summing amplifier summing the signal from the potentiometer FB and potentiometer CH as negative inputs and the voltage from the thermistor 58, 144 as a positive input in accordance with the expression $$V_{FB} = V_{58,144} + V_{CH}, \text{ or } A_{58,144} + V_{CH} - V_{FB} = 0,$$

where $V_{FB}$ is the voltage on the wiper of the output feedback potentiometer 73,136 and $V_{CH}$ is the voltage on the wiper of C relative temperature level selector 61,135. The control signal is provided to each motor 126,54 until the summation is zero, whereupon rotation of motor 54,126 ceases.

It will be understood that the user, either a front or rear passenger as the case may be, selects a blower speed with controller 78,118 based upon the ambient conditions and then adjusts the appropriate relative temperature, LEVEL SELECT control knob 137,62 for a perceived relative adjustment of the temperature level. The controller 66,118 then automatically modulates the coolant valve 106,24 to achieve the desired relative change in blower discharge temperature. Likewise, if the blower speed is changed, the system will modulate coolant flow accordingly to maintain the blower air discharge temperature constant.

It will be seen that the present invention provides a novel means for providing individual relative temperature level selection for the front and rear sections of a van passenger compartment. The system provides for automatic modulation of the heater water valve individually for the separate front and rear heater cores for separately regulating the blower plenum air discharge temperature. The present invention thus provides substantially constant blower air discharge temperature. For a given blower speed, the present invention provides for automatic coolant flow adjustment in response to a user selected relative temperature change. If the user then selects a different blower speed, the system automatically modulates water valve to maintain constant the selected relative blower air discharge temperature. The invention thus gives automatic temperature regulation and individual temperature control for front and rear passengers in vehicles having large passenger compartments such as vans and station wagons. Although the invention has hereinabove been described with respect to the illustrated embodiments, it will be understood that modifications and variations may be made to the invention which is limited only as a scope of the following claims.

What is claimed is:

1. A forced air heater discharge temperature control system for a vehicle passenger compartment having front and rear seating comprising:
   (a) a source of heated fluid including pump means for circulating same;
   (b) first exothermic heat exchanger means disposed for heating passenger compartment for said front seating and operatively connected to have said heated fluid circulated therethrough by said pump means;
   (c) front blower means operative to effect a flow of air over said first heat exchanger means;
   (d) front speed selector means disposed for ready access by passengers in said front seating and operative to enable said passengers to select the speed of said front blower means;
   (e) first valve means including a moveable valve member and including actuator means operative upon receipt of control input to move said valve member for controlling flow through said first heat exchanger means;
   (f) second exothermic heat exchanger means disposed for heating said passenger compartment for said rear seating and operatively connected to have said fluid circulated therethrough by said pump means;
   (g) rear blower means operative to effect a flow of air over said second heat exchanger means;
   (h) rear speed selector means disposed for ready access by passengers in said rear seating and operative to enable said passengers to select the speed of said rear blower means;
   (i) rear valve means disposed adjacent said second heat exchanger means including a moveable valve member and actuator means operative upon receipt of an electrical control signal to move said valve member for controlling flow through said valve means to said second heat exchanger means;
   (j) means operative to provide an electrical indication of the position of said rear valve member;
   (k) temperature sensing means disposed to sense the temperature of said forced air discharging over said second heat exchanger means and operative to provide an electrical signal indicative of said discharge temperature;
   (l) temperature selector means including a user actuator selector and disposed for ready access by passengers in said rear seating, said selector means operative to provide an electrical reference signal indicative of a user selected relative temperature level;
   (m) controller means connected to receive input from said temperature selector means, said temperature sensing means and said position indicating means, said controller means including means operable to sum only said inputs from said temperature selector means, said temperature sensing means and said position indicating means and provide a control signal to said rear valve actuator for moving said rear valve member until said sum is zero.

2. The control system defined in claim 1, further comprising: front temperature selector means disposed for ready access by passengers in said front seating operative to provide an electrical reference signal indicative of a user selected relative temperature level; means operable to provide an electrical indication of said first valve member; front temperature sensing means operative for providing an electrical signal indicative of the temperature of the air flow discharge over said first heat exchanger means; front controller means including means operable to sum only said inputs from said front temperature selector means, said front temperature sensing means and said first valve member position indicating means and provide said control input to said front valve means actuator means for said front valve member until said sum is zero.

3. The control system defined in claim 1, wherein said temperature selector means comprises a potentiometer.

4. The control system defined in claim 1, further comprising:
(a) third endothermic heat exchanger means disposed adjacent said first heat exchanger means and upstream thereof in said flow of air such that substantially all of said flow from said front blower means first passes over said third heat exchanger means and then over said first heat exchanger means;
(b) second temperature sensing means disposed to sense the temperature of said blower air discharging over said first heat exchanger means and operative to provide a second electrical temperature signal indicative of front blower air discharge temperature;
(c) second temperature selecting means disposed for operation by passengers in said front seating and operative to provide an electrical indication of the user selected level; and,
(d) means operative to provide an electrical indication of the position of said front valve member; and,
(e) second electrical controller means operative to sum only said second temperature sensing means signal, said second temperature selector means electrical indication and said electrical indication of said first valve member position and operative to provide said control input to said first valve means actuator means for moving said first valve means valve member until said sum is zero.

5. A method of independently controlling temperature in front and rear zones of a vehicle passenger compartment, comprising the steps of:
(a) providing a first heat exchanger in said rear zone and a moveable control valve member for controlling a flow of heated liquid therethrough;
(b) flowing a stream of air over said heat exchanger and directing the stream into said rear zone;
(c) selecting a desired relative temperature level for said rear zone and providing an electrical reference signal indicative thereof;
(d) sensing the temperature of said stream of air discharging from said heat exchanger, and providing a temperature signal indicative thereof;
(e) sensing the position of said control valve member and providing an electrical indication of said sensed position;
(f) electrically summing only said reference signal, and said temperature signal and said electrical indication of said valve member position;
(g) moving said control valve member until said sum is a zero for controlling flow of said heated liquid flow; and
(h) providing a second heat exchanger having a flow of heated liquid therethrough for said front zone and flowing a second stream of air thereover and directing said flow to said front zone.

6. The method defined in claim 5 further comprising the steps of:
(a) providing a third heat exchanger disposed upstream of said first heat exchanger; and
(b) circulating a flow of refrigerant in said third exchanger for cooling said stream of air before flow over said first heat exchanger.

7. The method defined in claim 5, further comprising the steps of:
(a) selecting a desired relative temperature level for said front zone and providing a second electrical reference signal indicative thereof;
(b) sensing the temperature of said stream of air discharging from said second heat exchanger and providing a second temperature signal indicative thereof;
(c) providing a second moveable valve member for controlling flow of said heated liquid to said second heat exchanger and sensing the position of said valve and providing an electrical indication thereof.
(d) summing only said second reference signal, said second temperature signal and said electrical indication of said second valve member; and,
(e) moving said second control valve member signal until said sum is zero for regulating flow of heated liquid to said second heat exchanger.

8. The method defined in claim 5, wherein said step of flowing a stream of air over said first and second heat exchanger includes the steps of providing a blower and selectively varying the speed of said blower.

9. The method defined in claim 5 wherein the step of moving said first valve member includes driving a servoactuator and the step of detecting the position of said valve member includes detecting the position of an output member of the servoactuator.

10. An air blower discharge temperature control system for vehicle passenger compartments with front and rear seating comprising:
(a) a front heat exchanger disposed in proximity to the front seating;
(b) first valve means, operable upon connection to a source of heated fluid, to circulate said fluid through said front heat exchanger;
(c) front blower means disposed adjacent said front heat exchanger to blow air to said front seating;
(d) front speed control means disposed for actuation by occupants of said front seating for selecting from a plurality of speeds of said front blower means;
(e) a rear heat exchanger disposed in proximity to said rear seating;
(f) second valve means including a moveable member operable upon connection to a source of heated heated fluid to control flow of said fluid through said rear heat exchanger;

(g) rear blower means operative to effect a flow of air over said rear heat exchanger means to said rear seating;

(h) rear speed control means disposed for actuation by occupants of said rear seating and operative to vary the speed of said rear blower means;

(i) temperature sensing means disposed adjacent said rear heat exchanger means and operative to provide an electrical signal indicative of the temperature of said air flow discharging to said rear seating;

(j) temperature level selection means disposed for ready access by occupants of said rear seating and operable upon said occupant actuation to provide an electrical reference signal indicative of a desired relative increase or decrease in the temperature of said air discharge;

(k) means operative to sense the position of said second valve member and to provide an electrical indication thereof;

(l) rear controller means operative to electrically sum only said sensed temperature signal, said reference signal, and said electrical indication of said second valve member; and, (m) actuator means responsive to said sum and operative to move said second valve means moveable member until said sum is zero.

11. A climate control ensemble for a vehicle passenger compartment comprising:

(a) a housing defining air inlet, a plenum chamber and a discharge outlet from said plenum, said housing adapted for mounting with said outlet discharging to a vehicle passenger compartment;

(b) an exothermic heat exchanger disposed in said housing between said air inlet and said discharge outlet and adapted for circulation of heated fluid therethrough;

(c) blower means mounted on said housing operable upon energization to effect a flow of air from said inlet to said discharge outlet;

(d) temperature sensing means disposed adjacent said outlet and operable to provide an electrical temperature signal indicative of discharge air flow temperature;

(e) valve means including a moveable valve member and operative upon connection to a source of heated fluid to control flow of said fluid through said heat exchanger;

(f) means operable to determine the position of said valve member and provide an electrical indication thereof;

(g) level select means adapted for mounting in a vehicle passenger compartment and operable upon user actuation to provide an electrical reference signal indicative of a selected relative temperature change;

(h) electrical controller means operable to sum only said reference signal, said temperature signal and said electrical indication of said valve member position and further operative to generate a control signal proportional to said sum; and, (i) servo-actuator means operatively responsive to said sum and operative to move said valve member until said sum is a zero for regulating flow through said valve means.

12. The ensemble defined in claim 11, further comprising an endothermic heat exchanger disposed in said housing adjacent and upstream of said exothermic heat exchanger and adapted to have refrigerant circulated therethrough, wherein said temperature signal for said summing includes and said exothermic heat exchangers.

13. The ensemble defined in claim 11 wherein said valve means and said servo-actuator means are mounted on said housing.

14. The ensemble defined in claim 11 further comprising to speed selector means for said blower means, said speed selector means adapted for mounting in the vehicle for ready access by passengers.

15. The ensemble defined in claim 11 further comprising an endothermic heat exchanger disposed in said housing adjacent and upstream of said exothermic heat exchanger; and, expansion valve means mounted on said housing operable upon connection to a source of refrigerant to control flow thereof through said exothermic heat exchanger.

16. The ensemble defined in claim 11 further comprising an endothermic heat exchanger disposed in said housing adjacent and upstream of said exothermic heat exchanger and adapted to have refrigerant circulated therethrough, said endothermic and exothermic heat exchangers formed with common integral fins, wherein said temperature signal for said summing includes the combined effect of air flow over said endothermic and exothermic heat exchangers.

17. A method of controlling the temperature of air discharged into a vehicle passenger compartment comprising the steps of:

(a) providing a heat exchanger and flowing heated fluid therethrough;

(b) blowing a stream of air over said heat exchanger and directing the discharge therefrom into the vehicle passenger compartment;

(c) sensing the temperature of the air discharge from the heat exchanger into the passenger compartment and providing an electrical temperature signal indicative of the sensed temperature;

(d) providing a valve having a movable member for controlling the flow of heated fluid through said heat exchanger and providing an electrical indication of the position of said valve member;

(e) providing an electrical reference signal indicative of a user desired relative change in said discharge air temperature; and, (f) summing only said electrical reference signal, said temperature signal and said electrical indication of said valve position and moving said valve member until said sum is zero for regulating the temperature of said discharge air from said heat exchanger.

18. The method defined in claim 17, wherein the step of providing a heat exchanger, includes the step of providing separate heat exchangers in the front and rear of the passenger compartment; and the step of providing a valve includes the step of providing a separate valve for each heat exchanger.

* * * * *